United States Patent [19]

Cole et al.

[11] Patent Number: 4,766,974

[45] Date of Patent: Aug. 30, 1988

[54] SEISMIC SIGNAL GENERATOR WITH A SELF-EXPANDING VIBRATOR SUPPORT BASE

[75] Inventors: Jack H. Cole; Richard K. Thomson, both of Ponca City, Okla.

[73] Assignee: Conoco Inc., Ponca City, Okla.

[21] Appl. No.: 880,761

[22] Filed: Jun. 30, 1986

[51] Int. Cl.⁴ .......................... G01V 1/04; H04R 1/02
[52] U.S. Cl. .................... 181/113; 367/189; 181/119; 181/121; 181/401
[58] Field of Search .............. 181/113, 114, 116, 117, 181/119, 121, 140, 142, 401; 367/143, 189, 190, 75; 92/2, 13.1; 73/662, 665

[56] References Cited

U.S. PATENT DOCUMENTS

| | | | |
|---|---|---|---|
| 3,372,770 | 3/1968 | Clynch | 367/75 X |
| 3,416,632 | 12/1968 | Bodine, Jr. | 367/189 X |
| 3,716,111 | 2/1973 | Lavergne | 181/0.5 |
| 3,983,957 | 10/1976 | Silverman | 181/121 |
| 4,135,598 | 1/1979 | Stafford | 181/114 |
| 4,135,599 | 1/1979 | Fair | 181/121 |
| 4,296,828 | 10/1981 | Layotte et al. | 181/121 |
| 4,410,062 | 10/1983 | Mifsud | 181/121 |
| 4,442,916 | 4/1984 | Fair | 181/114 X |
| 4,641,725 | 2/1987 | Cole et al. | 181/119 |

Primary Examiner—Charles T. Jordan
Assistant Examiner—Brian S. Steinberger
Attorney, Agent, or Firm—Richard K. Thomson

[57] ABSTRACT

A seismic signal generator with a self-adjusting footprint base plate. A signal generator for use on paved or other hard surfaces, has a pair of tread members (preferably urethane) that are laterally slidable with respect to the reaction mass. The tread members are biased outwardly away from the reaction mass. Should slippage from the point of initial placement occur during signal generation, the biasing force will continue to move the tread members outwardly to a more stable position, thereby achieving optimum intimate contact between the generator and the surface of the ground maximizing signal transfer into and through that surface.

20 Claims, 2 Drawing Sheets

SEISMIC SIGNAL GENERATOR WITH A SELF-EXPANDING VIBRATOR SUPPORT BASE

BACKGROUND AND SUMMARY OF THE INVENTION

The present invention pertains to support bases of vibrators that are used as seismic signal generators. More particularly, this invention is directed to a shear wave seismic signal generator with a support base that can be used on a hard surface and which is self-expanding in response to slippage on that surface to achieve a more stable position.

Vibrational devices that are used as seismic signal generators (particularly shear wave generators) are often equipped with bases that have spikes, inverted cones, or the like, positioned on the ground-engaging surface to penetrate the surface of the ground to insure positive (i.e., non-slipping) engagement between the generator and the ground. These generators do significant damage to the surface of the ground. Accordingly, such generators cannot be used where such damage cannot be tolerated, e.g., on pavement or other similar hard surfaces. If a patterned seismic array is taken in the vicinity of such a surface, the inability of existing generators to transmit a signal through such a surface can produce a hole in the data or otherwise render the information obtained from the seismic testing incomplete.

It is an object of the present invention to provide a seismic signal generator that can be utilized on paved or other hard surfaces. It is yet a further object to provide such a generator that is capable of self adjustment should slippage occur in order to achieve a more stable footing.

These and other objects of the present invention are accomplished by replacing the solid vibrator support base typical of such generators with a pair of tread members. These tread members are interconnected to the vibrator3 s reaction mass by means which permits lateral translational movement by the treads with respect to the reaction mass. The treads can slide (translate) on guide rods and after placement under load, the treads are biased outwardly away from the reaction mass by 2000-3000 psi hydraulic fluid. If the initial positioning of the treads is unstable (i.e., if any slippage is incurred), the hydraulic fluid will hold the tread in the outer position to which it has slipped. This process continues until the most stable condition possible is achieved by the treads insuring optimum contact between the signal generator and the surface of the ground for maximum signal transfer.

Various other characteristics, features and objectives of the present invention will become apparent after a reading of the following specification.

DETAILED DESCRIPTION OF THE PREFERRED EMBODIMENTS

Figure 2:
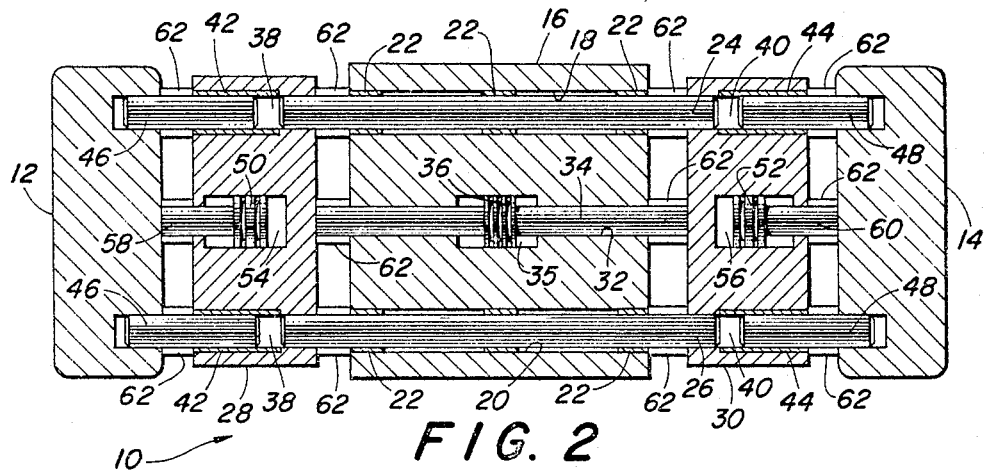
FIG. 2 is a cross-sectional view of the seismic signal generator as seen along line 2—2 of FIG. 1.
Figure 1:
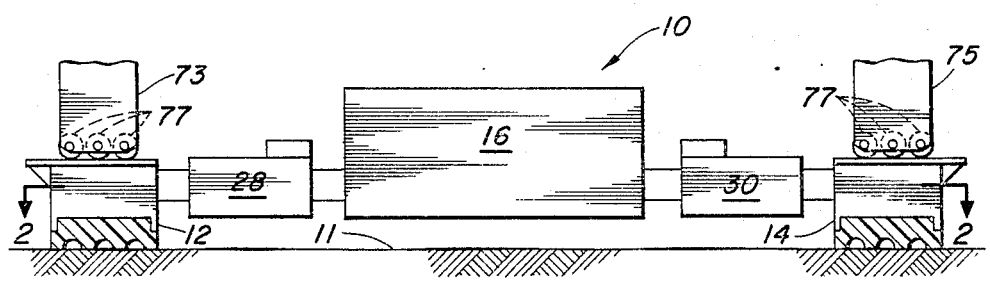
FIG. 1 is a side elevational view of the seismic signal generator of the present invention depicting a first embodiment of the self-expanding support base.

One embodiment of seismic signal generator of the present invention is shown in FIGS. 1 and 2 generally at 10. The base plate of the present invention is comprised of a pair of tread members 12 and 14 which are interconnected to reaction mass 16 for lateral translational movement by structure to be explained in detail hereafter. Tread members 12 and 14 may have ground-engaging surface portions comprised of urethane blocks with a friction-increasing tread design, if desired.

Reaction mass 16 has first and second throughbores 18 and 20 extending through the lower third of said mass. Slide bushings 22 are press fit into the throughbores 18 and 20 and slidingly receive elongated tie (or guide) rods 24 and 26 respectively. The ends of tie rods 24 and 26 are press fit, or otherwise securely attached, to cross members 28 and 30. Tie rods 24 and 26 couple cross members 28 and 30 together for movement as a unit independently of reaction mass 16.

A third throughbore 32 extends through reaction mass 16 between first and second throughbores 18 and 20. A piston rod 34 extends through throughbore 32 and is fixedly attached at either end to cross members 28 and 30 as by welding, or the like. Piston head 36 is generally centered on piston rod 34, is received in chamber 35 in reaction mass 16, and by means of a hydraulic fluid system (not shown), induces vibration of the system in a conventional manner.

Throughbores 38 and 40 in cross members 28 and 30, respectively, receive slide bushings 42 and 44 which, in turn, receive pairs of guide rods 46 and 48. The outer ends of guide rods 46 and 48 are press fit, or otherwise securely attached, to tread members 12 and 14, respectively. Guide rods 46 and 48 maintain alignment of treads 12 and 14 with respect to cross members 28 and 30. Bushings 42 and 44 are press fit into throughbores 38 and 40 and guide rods slide freely in said bushings. Piston heads 50 and 52 are received in cavities 54 and 56, respectively, in cross members 28 and 30. Piston heads 50 and 52 are mounted on one end of piston rods 58 and 60 with the opposite end of said rods being securely attached to tread members 12 and 14. All exposed external surfaces of tie rods 24 and 26, piston rods 34, 58 and 60, and pairs of guide rods 46 and 48 are covered with expandable elastomeric boots 62 to keep dust and dirt from fouling operation of these sliding members.

Figure 3:
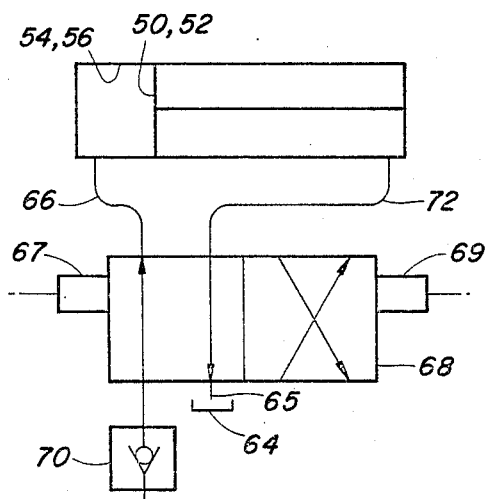
FIG. 3 is a schematic depiction of the hydraulic flow loop used to outwardly bias the tread members.

The hydraulic system that operates pistons 50 and 52 is shown schematically in FIG. 3. The piston head sides of the cavities 54 and 56 are alternately connectable to a source of pressurized (preferably, hydraulic) fluid supplied by a constant pressure pump (not shown) and a discharge line 65 to tank 64 by a first supply line 66 through a slide valve 68 and a check valve 70. The opposite sides of the cavities 54 and 56 are alternately connectable to the other of the tank 64 and supply pump by a second supply line 72 through slide valve 68 and check valve 70. Slide valve 68 is operated by connecting hydraulic (or pneumatic) fluid to one of the inlet ports 67 and 69.

In operation, the seismic signal generator 10 of the present invention is lowered into contact with the hard surface 11 where the seismic reading is to be taken. Typically, such generators are suspended beneath a truck or other vehicle (not shown) from where they can be lowered into surface contact. A substantial portion of the weight of the vehicle is then transferred to the tread members 12 and 14 by hold-down arms 73 and 75. Hold-down arms 73 and 75 engage tread members 12 and 14 through a series of rollers 77. Rollers 77 minimize the amount of vibrational force transmitted back through hold-down arms 73 and 75 to the suspension vehicle. Further, rollers 77 permit lateral adjustability of tread members 12 and 14 in accordance with the principles of the present invention.

Once tread members 12 and 14 have been placed in an initial position and loaded down, fluid is directed to inlet port 67 to interconnect the fluid pump to the piston head side of cavities 54 and 56, hydraulic cylinders 50 and 52 being biased outwardly away from reaction mass 16 by said hydraulic fluid. The fluid is preferably pressurized to a level exceeding 2000 psi and most preferably in a range of between 2000 and 3000 psi. Hydraulic fluid is then rapidly pulsed to alternating sides of piston head 36. Since reaction mass 16, for all intents and purposes, remains stationary due to its size, vibrational forces are transmitted to cross members 28 and 30 by piston rod 34, while tie rods 24 and 26 help insure that cross members 28 and 30 are vibrated essentially as a unit. The vibrational forces are transmitted from the cross members 28 and 30 to tread members 12 and 14 through the hydraulic fluid in piston cavities 54 and 56. Tread members 12 and 14 transmit seismic shear wave signals into the ground. Should any fluid ooze past the double O-ring seals of the piston heads 50 and 52, any such fluid that is excess will merely be pumped back to tank 64 and fluid pumped through check valve 70 will insure a continuous supply pressure to the piston head side of cavities 54 and 56. Check valve 70 prevents back flow through the supply pump as pressures in piston cavities 54 and 56 fluctuate above and below supply pressure level during the vibrating action.

Suppose that the initial placement of the tread member 12 is unstable, i.e., that the coefficient of friction between tread member 12 and surface 11 is insufficient and slippage occurs as vibration begins. The hydraulic pressure acting on piston head 50 will translate tread 12 during the phase of the vibrational signal in the direction outward from reaction mass 16 in that outward direction and continue to do so until a stable position is achieved (i.e., until slippage stops).

Another way to view what is happening is this. With the typical non-adjusting support bases of the prior art, the impact point of the support base is retracted after each impact in the manner of a jack hammer bit. Accordingly, the vibratory seismic signal generator may essentially bounce around on the hard surface without ever obtaining stable contact. The self-adjusting foot-print base plate of the present invention enables the treads 12 and 14, in the manner of a nail struck by a hammer, to hold a more stable position between impacts, so that optimum intimate contact between the signal generator and the surface is achieved, resulting in maximum shear wave signal transmission into the ground without destroying the surface.

Figure 4:
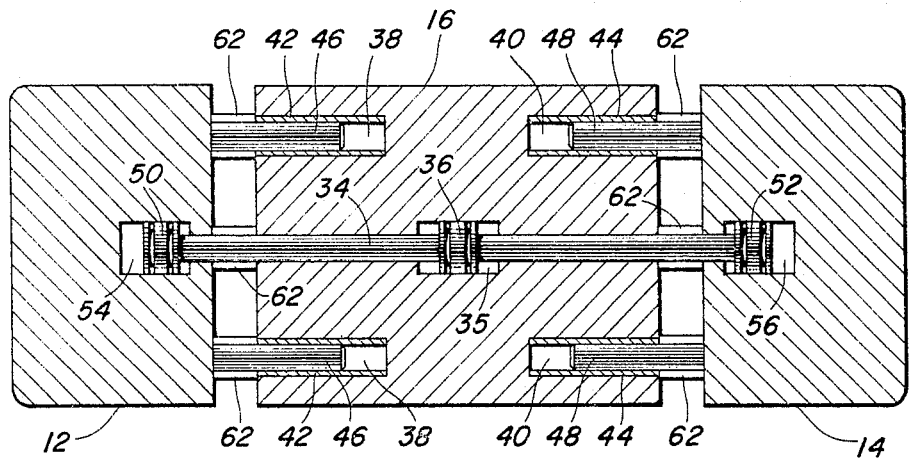
FIG. 4 is a cross-sectional view similar to FIG. 2 of an alternative embodiment of a support base used with the seismic signal generator of the present invention.

A second embodiment is depicted in FIG. 4 with like elements having the same reference numerals as in the previous embodiment. The principal feature of this invention is that the cross members 28 and 30 of the first embodiment have been eliminated. Piston heads 50 and 52 which adjust tread members 12 and 14 are positioned on the ends of piston rod 34 and the piston cavities 54 and 56 are formed in the body of tread members 12 and 14. Throughbores 18 and 20 of the previous embodiment are replaced by stub bore pairs 38 and 40 which receive the slide bushings 42 and 44 for guide rod pairs 46 and 48. This embodiment reduces, by half, the number of elastomeric boots 62 needed to protect exposed rod portions of relatively sliding members. The hydraulic system of FIG. 3 will be interconnected in like manner as in the previous embodiment, pressure to the piston head side of chambers 54 and 56, again, effecting an outward force on tread members 12 and 14.

As with the previous embodiment, once the signal generation is completed, slide valve 68 is operated by inputting fluid to port 69 to reverse fluid flow in the closed loop hydraulic system thereby retracting tread members 12 and 14. Retraction preferably is done as the treads are being unloaded by hold-down arms 73 and 75 in order to reduce the magnitudes of the opposing forces simultaneously.

Various changes, alternatives and modifications will become apparent to one of ordinary skill in the art following a reading of the foregoing specification. For example, although the seismic signal generator of the present invention has urethane treads for engaging hard surfaces, it is apparent tread members 12 and 14 could be equipped with retractable spikes or cones to permit more conventional signal generation on softer surfaces. Accordingly, all such changes, alterations and modifications as fall within the scope of the appended claims should be considered part of the present invention.

We claim:

1. A seismic signal generator that can be used on a hard surface, said apparatus comprising:
   a reaction mass;
   A pair of tread members interconnected to, and forming the sole means of support for, said reaction mass by means permitting lateral translational movement of said tread members with respect to said reaction mass without changing the relative vertical positions between said tread members and said reaction mass, said tread members having ground engaging portions;
   means for inducing relative vibrational motion between said tread members and said reaction mass in order to transmit a seismic signal into a region through said hard surface solely by means of said tread members from an original location;
   means for biasing said tread members laterally outwardly away from said reaction mass such that, should the coefficient of friction between the ground-engaging portions of said tread members and said hard surface in said original location be insufficient to prevent slippage during said vibrational motion, said biasing means will translate said tread members to a second more stable location laterally outward from said first location.

2. The seismic signal generator of claim 1 wherein the ground-engaging portions of said tread members comprise urethane blocks.

3. The seismic signal generator of claim 1 wherein said biasing means exerts a substantially continuous force throughout the period of seismic signal generation.

4. The seismic signal generator of claim 1 wherein said biasing means comprises a piston head.

5. The seismic signal generator of claim 4 wherein said biasing means further comprises hydraulic fluid reacting against said piston head.

6. The seismic signal generator of claim 5 wherein said hydraulic fluid is at a pressure which exceeds 2000 psi.

7. The seismic signal generator of claim 5 wherein said hydraulic fluid is at a pressure which falls in a range from about 2000 psi to about 3000 psi.

8. The seismic signal generator of claim 1 wherein said means interconnecting said tread members to said reaction mass includes a plurality of guide rods engaged in slide bushings.

9. The seismic signal generator of claim 8 wherein said slide bushings are received in said reaction mass.

10. The seismic signal generator of claim 1 wherein said means interconnecting said tread members to said reaction mass includes one cross member positioned intermediate said reaction mass and each of said tread members.

11. The seismic signal generator of claim 10 wherein said means interconnecting said tread members to said reaction mass includes means interconnecting said two intermediate cross members.

12. The seismic signal generator of claim 11 wherein said means interconnecting said tread members to said reaction mass further comprises guide rods engaged in slide bushings.

13. The seismic signal generator of claim 12 wherein said slide bushings are in said reaction mass.

14. The seismic signal generator of claim 13 wherein said slide bushings are also in said cross members.

15. The seismic signal generator of claim 1 wherein said means for inducing relative vibrational motion comprises a first piston rod having a predetermined length, a first piston head centered along the length of said piston rod.

16. The seismic signal generator of claim 15 wherein said means for biasing said tread members outwardly comprise second and third piston heads, one said piston head mounted for translational movement in each tread member.

17. The seismic signal generator of claim 16 wherein said second and third piston heads are mounted on opposite ends of said first piston rod.

18. The seismic signal generator of claim 17 wherein said second and third piston heads each have an inward surface and an outward surface as defined relative to said reaction mass and said biasing means further comprises hydraulic fluid engaging the outward surfaces of said piston heads.

19. The seismic signal generator of claim 18 wherein said hydraulic fluid has a pressure in the range from about 2000 to about 3000 psi.

20. A method of generating a seismic shear wave signal through a hard surface, said method comprising:
 supporting a reaction mass for lateral oscillatory movement relative to, and solely upon, a pair of tread members;
 loading said tread members to increase intimate contact with said hard surface;
 outwardly biasing said tread members laterally away from said reaction mass with a biasing force;
 inducing relative translational, vibrational motion between said reaction mass and said tread members to transmit shear waves solely by means of said tread members into and through said hard surface;
 said biasing force being effective, in the event of slippage by one or both tread members, to translate said slipping tread member(s) outwardly to a more stable position to achieve more intimate contact with said hard surface.

* * * * *